(12) United States Patent
Krishna et al.

(10) Patent No.: US 9,716,739 B2
(45) Date of Patent: Jul. 25, 2017

(54) SYSTEM AND METHOD FOR DETERMINING DETERIORATION IN CALL QUALITY BETWEEN ONE OR MORE WIRELESS END-USERS BASED ON CODEC CHARACTERISTICS

(71) Applicant: Aruba Networks, Inc., Sunnyvale, CA (US)

(72) Inventors: Navaneetha Krishna, Bangalore (IN); Brijesh Yadav, Bangalore (IN); Venkatesh Joshi, Bangalore (IN); Gopal Agarwal, Bangalore (IN)

(73) Assignee: Aruba Networks, Inc., Sunnyvale, CA (US)

(*) Notice: Subject to any disclaimer, the term of this patent is extended or adjusted under 35 U.S.C. 154(b) by 100 days.

(21) Appl. No.: 14/721,083

(22) Filed: May 26, 2015

(65) Prior Publication Data
US 2016/0352801 A1    Dec. 1, 2016

(51) Int. Cl.
*H04L 12/66* (2006.01)
*H04L 29/06* (2006.01)
*H04L 12/24* (2006.01)
*H04L 12/26* (2006.01)

(52) U.S. Cl.
CPC .......... *H04L 65/80* (2013.01); *H04L 41/5035* (2013.01); *H04L 43/0894* (2013.01); *H04L 43/16* (2013.01); *H04L 65/608* (2013.01); *H04L 69/22* (2013.01)

(58) Field of Classification Search
CPC ..... H04L 12/66; H04L 12/14; H04L 12/6418; H04L 65/80; H04L 65/608; H04L 69/22; H04L 41/5035; H04L 43/0894; H04L 43/16
USPC .......................................................... 370/352
See application file for complete search history.

(56) References Cited

U.S. PATENT DOCUMENTS

| | | | |
|---|---|---|---|
| 2007/0054645 A1* | 3/2007 | Pan ....................... | H04W 24/08 455/266 |
| 2008/0052394 A1* | 2/2008 | Bugenhagen ........... | H04L 12/14 709/224 |
| 2012/0191826 A1* | 7/2012 | Gotesdyner ......... | H04L 12/6418 709/221 |

* cited by examiner

*Primary Examiner* — Sai-Ming Chan
(74) *Attorney, Agent, or Firm* — Brooks, Cameron & Huebsch, PLLC

(57) ABSTRACT

The present disclosure discloses a system and method for determining deterioration in call quality between one or more wireless end-users based on codec characteristics. Specifically, a network device determines a codec associated with a call between two client devices. Then, the network device determines a transmission rate based on the codec. Moreover, the network device estimates a number of packets to be received by an access point that a first client device is associated with based on the transmission rate, and compares the estimated number of packets to an actual number of packets received by the access point. If a difference between the estimated number and the actual number of packets exceeds a threshold, the network device diagnoses that a poor call quality associated with the call is due to either the first client device or network connectivity between the first client device and the access point.

20 Claims, 6 Drawing Sheets

```
210   215  220 225 230
  \    \   \ \  \
   0            1           2           3
   0 1 2 3 4 5 6 7 8 9 0 1 2 3 4 5 6 7 8 9 0 1 2 3 4 5 6 7 8 9 0 1
  +-+-+-+-+-+-+-+-+-+-+-+-+-+-+-+-+-+-+-+-+-+-+-+-+-+-+-+-+-+-+-+-+
  |V=2|P|X|  CC   |M|     PT 235  |       sequence number  240    |
  +-+-+-+-+-+-+-+-+-+-+-+-+-+-+-+-+-+-+-+-+-+-+-+-+-+-+-+-+-+-+-+-+
  |                           timestamp 250                       |
  +-+-+-+-+-+-+-+-+-+-+-+-+-+-+-+-+-+-+-+-+-+-+-+-+-+-+-+-+-+-+-+-+
  |           synchronization source (SSRC) identifier  260       |
  +=+=+=+=+=+=+=+=+=+=+=+=+=+=+=+=+=+=+=+=+=+=+=+=+=+=+=+=+=+=+=+=+
  |             contributing source (CSRC) identifiers  270       |
  |                              ....                             |
  +-+-+-+-+-+-+-+-+-+-+-+-+-+-+-+-+-+-+-+-+-+-+-+-+-+-+-+-+-+-+-+-+
                                       \__ 200
```

FIG. 2

| Payload Type 310 | Name 320 | Description 330 |
| --- | --- | --- |
| 0 | PCMU | ITU-T G.711 PCM μ-Law audio 64 kbit/s |
| 1 | reserved (previously 1016) | reserved, previously CELP audio 4.8 kbit/s |
| 2 | reserved (previously G721) | reserved, previously ITU-T G.721 ADPCM audio 32 kbit/s |
| 3 | GSM | European GSM Full Rate audio 13 kbit/s (GSM 06.10) |
| 4 | G723 | ITU-T G.723.1 audio |
| 5 | DVI4 | IMA ADPCM audio 32 kbit/s |
| 6 | DVI4 | IMA ADPCM audio 64 kbit/s |
| 7 | LPC | Experimental Linear Predictive Coding audio 5.6 kbit/s |
| 8 | PCMA | ITU-T G.711 PCM A-Law audio 64 kbit/s |
| 9 | G722 | ITU-T G.722 audio 64 kbit/s |
| 10 | L16 | Linear PCM 16-bit Stereo audio 1411.2 kbit/s |
| 11 | L16 | Linear PCM 16-bit audio 705.6 kbit/s, uncompressed |
| 12 | QCELP | Qualcomm Code Excited Linear Prediction |
| 14 | MPA | MPEG-1 or MPEG-2 audio only |
| 15 | G728 | ITU-T G.728 audio 16 kbit/s |
| 16 | DVI4 | IMA ADPCM audio 44.1 kbit/s |
| 17 | DVI4 | IMA ADPCM audio 88.2 kbit/s |
| 18 | G729 | ITU-T G.729 and G.729a audio 8 kbit/s |
| 25 | CELB | Sun CellB video |
| 26 | JPEG | JPEG video |
| 28 | nv | Xerox PARC's Network Video |
| 31 | H261 | ITU-T H.261 video |
| 32 | MPV | MPEG-1 and MPEG-2 video |
| 33 | MP2T | MPEG-2 transport stream |
| 34 | H263 | H.263 video, first version |

FIG. 3

SYSTEM AND METHOD FOR DETERMINING DETERIORATION IN CALL QUALITY BETWEEN ONE OR MORE WIRELESS END-USERS BASED ON CODEC CHARACTERISTICS

FIELD

Embodiments of the present disclosure relate to call management in wireless or hybrid networks. In particular, embodiments of the present disclosure describe a system and a method for determining deterioration in call quality between one or more wireless end-users based on codec characteristics.

BACKGROUND

In a wireless network or a wireless/wired hybrid network, a call between two client devices may deteriorate for a variety of reasons. For example, there may be problems occurring at an end user, such as a dysfunctional microphone or headphone. In addition, the call quality may deteriorate due to connectivity problems between an end user and an access point that the end user's client device is associated with. The connectivity determines the level of service received by the end-user. Typical problems may include—the end-user is experiencing bad quality due to low signal strength of the connection; the end-user is experiencing bad quality due to interference from the surrounding environment; etc. Moreover, the call quality may deteriorate due to problems with the connections in the wired network.

This makes it more challenging for the network administrator to figure out the real cause which led to the bad call quality. Currently, a number of techniques are used to detect or diagnose a deterioration of call quality in a wireless or hybrid network. For example, Aruba Networks® Real-time Transport Protocol (RTP) analysis can be used in accessing bad call quality. However, RTP analysis merely provides a quantitative measurement of the call quality in the downstream direction over the wireless link between the AP and the end-user. In addition, end-to-end call quality information is also used to diagnose a deterioration of call quality. Nevertheless, such information provides a quantitative measurement of the call quality as perceived by the end users.

In sum, while the RTP analysis provides the quality information about the wireless link, and the end-to-end call measurement gives information about the end-to-end call, neither of these techniques is able to provide any detailed information regarding where is the cause for the deteriorated call quality.

DETAILED DESCRIPTION

In the following description, several specific details are presented to provide a thorough understanding. While the context of the disclosure is directed to diagnosing call quality issues in wireless or hybrid networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

FIG. 2 is a block diagram illustrating an exemplary real-time transport protocol (RTP) packet header used for determining deterioration in call quality according to embodiments of the present disclosure.

FIG. 3 is a block diagram illustrating an exemplary codec list used for determining deterioration in call quality according to embodiments of the present disclosure.

OVERVIEW

Embodiments of the present disclosure relate to diagnosing call quality issues in wireless or hybrid networks. In particular, embodiments of the present disclosure describe a system and a method for determining deterioration in call quality between one or more wireless end-users based on codec characteristics.

According to embodiments of the present disclosure, a network device determines a codec associated with a call between a first client device and a second client device in a wireless or hybrid network. The network device then determines a transmission rate based on the codec associated with the call. Next, the network device estimates a number of packets to be transmitted by an access point that the first client device is associated with based on the determined transmission rate. Further, the network device compares the estimated number of packets to be received by the access point to the actual number of packets received by the access point. In response to a difference between the estimated number and the actual number of packets exceeding a threshold value, the network device diagnoses that a poor call quality associated with the call is due to either the first client device or the network connectivity between the first client device and the access point.

Network Environment

Figure 1A:
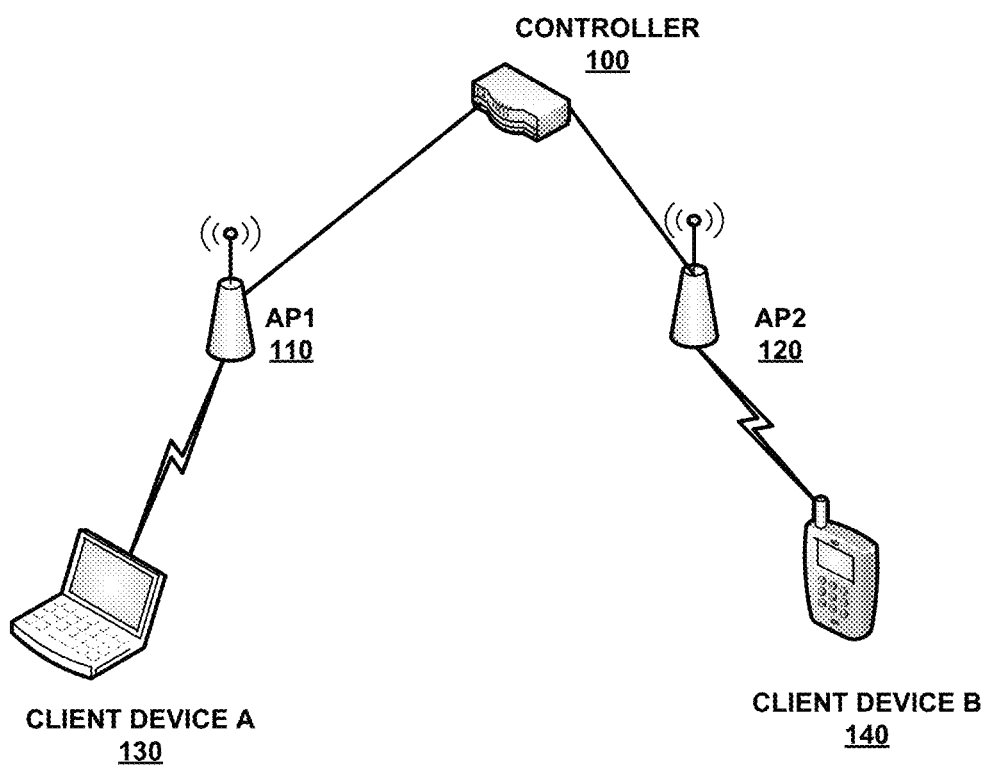
FIG. 1A is a block diagram illustrating an exemplary wireless network environment for determining deterioration in call quality between one or more wireless end-users based on codec characteristics according to embodiments of the present disclosure.

FIG. 1A a block diagram illustrating an exemplary wireless network environment for determining deterioration in call quality between one or more wireless end-users based on codec characteristics according to embodiments of the present disclosure. The wireless network environment as illustrated in FIG. 1A includes at least a network controller 100, a number of access points (APs), such as AP1 110, AP2 120, etc., and a number of client devices, such as Client Device A 130, Client Device B 140, etc.

Network controller 100 generally refers to a controlling device that manages other network devices such as wireless access points. Network controller 100 may handle automatic adjustments to radio frequency power, wireless channels, wireless authentication, and/or security.

Each AP provides network services to zero or more client device. Specifically, each AP operates on a particular wireless communication channel and communicates with its client devices on the particular wireless communication channel. For example, in FIG. 1A, AP1 110 provides network services to Client Device A 130; AP2 120 provides network services to Client Device B 140. The access points can be located either within the same campus as network controller 100, or in a remote office and connected to network controller via a secured tunnel.

Client devices may be running a number of applications, including but not limited to, VoIP applications, voice/video streaming applications, uniform communication applications, etc. Such applications on a client device may need to initiate a call over the wireless network while the client device is associated with an access point.

In the example illustrated in FIG. 1A, assume that a call is in progress between Client Device A 130 and Client Device B 140. Specifically, an upstream transmission may be initiated by Client Device B 140 to Client Device A 130. On AP2 120, statistics corresponding to packets received from Client Device B 140 are monitored. Likewise, on AP1 110, statistics corresponding to packets transmitted to Client Device A 120 are monitored.

Figure 1B:
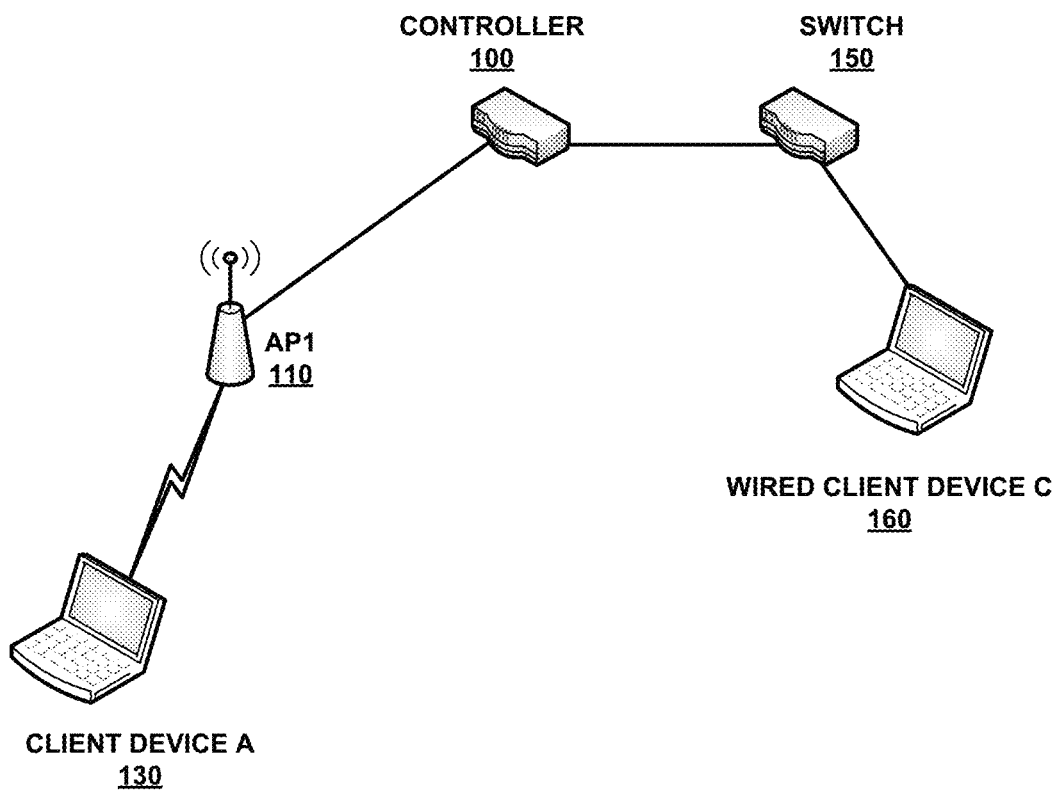
FIG. 1B is a block diagram illustrating an exemplary hybrid network environment for determining deterioration in call quality between one or more wireless end-users based on codec characteristics according to embodiments of the present disclosure.

FIG. 1B a block diagram illustrating an exemplary hybrid network environment for determining deterioration in call quality between one or more wireless end-users based on codec characteristics according to embodiments of the present disclosure. The hybrid network environment as illustrated in FIG. 1B includes at least a network controller 100, an access point AP1 110, a switch 150, and a number of client devices, such as Client Device A 130, Client Device C 160, etc. Specifically, in this example, Client Device A 130 is a wireless client associated with AP1 110. Moreover, Client Device C 160 is a wired client connected to switch 150.

Network switch 150 generally refers to a networking device that connects devices together on a network, by using packet switching to receive, process and forward data to the destination device. Network switch 150 typically forwards data to one or multiple devices that need to receive it, rather than broadcasting the same data out of each of its ports. Network switch 150 usually is a multiport network bridge that uses hardware addresses to process and forward data at the data link layer (layer 2), but can also process data at the network layer (layer 3) and incorporate routing functionality that uses IP addresses to perform packet forwarding.

In the example illustrated in FIG. 1B, assuming that a call is in progress between Client Device A 130 and Client Device C 160. Specifically, an upstream transmission may be initiated by Client Device C 160 to Client Device A 130. On AP1 110, statistics corresponding to packets transmitted to Client Device A 120 are monitored.

Whenever a call is made between client devices, the end-to-end call quality is investigated, for example, using RTP analysis. If the call quality is determined to be inferior, then the network infrastructure would need to determine whether the deterioration is due to problems with either of the client devices or the network connectivity.

On the other hand, even if the end-to-end call quality is good, there may still be problems with the client devices or the network connectivity. As an example, many modern-day devices use sophisticated mechanisms to eliminate the effects of delay, jitter, packet loss, etc. For example, the system can either buffer at the end user, or use sophisticated compensation schemes to alleviate packet loss, etc. The net impact of such mechanisms is to hide problems, such as delay, jitter, packet loss, etc., that are present in the network. Therefore, even with good end-to-end call quality, there might still be problems in the network that need to be solved.

According to embodiments of the present disclosure, the network infrastructure will monitor and co-relate the sender and receiver statistics for an active call in a wireless or hybrid network to provide insights into which segment of the call is the cause for the bad call quality. Then, the network infrastructure can initiate various corrective actions if it determines that the problem lies in the wireless network connectivity.

Codec Analysis

A. RTP Header

According to embodiments of the present disclosure, all media traffic is carried using RTP protocol. FIG. 2 illustrates an exemplary RTP header format. Specifically, RTP packet 200 includes at least the following header fields: V 210, P 215, X 220, CC 225, M 230, PT 235, sequence number 240, timestamp 250, synchronization source (SSRC) identifier 260, contributing source (CSRC) identifiers 270, etc.

Here, V 210 is a 2-bit field indicating the version of the protocol. P 215 represents padding, which is a 1-bit field used to indicate if there are extra padding bytes at the end of the RTP packet. A padding might be used to fill up a block of certain size, for example as required by an encryption algorithm. The last byte of the padding contains the number of padding bytes that were added. X 220 represents extension, which is a 1-bit field indicating presence of an extension header between standard header and payload data. This is application or profile specific. CC 225 represents CSRC Count, which is a 4-bit field that contains the number of CSRC identifiers following the fixed header. M 230 represents marker, which is a 1-bit field used at the application level and defined by a profile. If it is set, it means that the current data has some special relevance for the application.

PT 235 represents payload type, which is a 7-bit field indicating the format of the payload and determines its interpretation by the application. This is specified by an RTP profile. PT 235 also includes codec information.

Sequence number 240 is a 16-bit field. Sequence number 240 is incremented by one for each RTP data packet sent and is to be used by the receiver to detect packet loss and to restore packet sequence. The RTP does not specify any action on packet loss. Thus, it is left to the application to take appropriate action. For example, video applications may play the last known frame in place of the missing frame. The initial value of the sequence number should be random to make known-plaintext attacks on encryption more difficult. RTP provides no guarantee of delivery, but the presence of sequence numbers makes it possible to detect missing packets.

Timestamp 250 is a 32-bit field that is used to enable the receiver to play back the received samples at appropriate intervals. When several media streams are present, the timestamps are independent in each stream, and may not be relied upon for media synchronization. The granularity of the timing is application specific. For example, an audio application that samples data once every 125 μs would use that value as its clock resolution. The clock granularity is one of the details that is specified in the RTP profile for an application.

Synchronization source identifier (SSRC) 260 is a 32-bit field that uniquely identifies the source of a stream. The synchronization sources within the same RTP session will be unique.

Contributing source identifiers (CSRC) 270 is a set of 32-bit fields. Each contributing source identifier enumerates a contributing source to a stream which has been generated from multiple sources.

B. Payload Type

When a RTP packet is received by an access point, the access point can perform a deep packet inspection to of the RTP packet to determine the codec being used. Specifically, the access point can look up the payload type field value of the RTP header, and determine the codec associated with the RTP packet based on the payload type value.

FIG. 3 is a block diagram illustrating an exemplary codec list 300 used for determining deterioration in call quality. Codec list 300 includes at least a field for payload type 310, name of codec 320, and description of codec 330. Note that the payload type value typically ranges from 0 to 127. The codec list 330 in FIG. 3 is a simplified example provided for illustration purposes only.

Every codec is given at least one particular payload type value. However, there may be more than one payload type values that match to a particular codec. For example, G.711 codec is given a payload type value 0 for the μ-Law and a payload type value 8 for the A-Law. This is because the G.711 codec may be used in various geographic regions, for example, one payload type value (e.g., 0) for use in the North America and the other payload type value (e.g., 8) for use in the other parts of the world. Nevertheless, at a given time, a single payload type would be used for a given call. If two client devices are calling each other from two different geographic regions corresponding to two different payload type values, then the payload type value for a particular RTP packet would be based on the direction of packet transmission. For example, if Client A is located in North America and Client B is located in Europe, then payload type value 0 will be used in the RTP packets transmitted from Client A to Client B and payload type value 8 will be used in the RTP packets transmitted from Client B to Client A.

Therefore, based on the payload type, the access point can determine the particular codec being used for transmission, as well as the transmission rate corresponding to the particular codec.

C. Codec Negotiation

Codec is typically a property of client device and is determined by the client device's hardware capabilities of encoding signals. Before each client device initiates a call, each client device will provide to a network server a list of codec that the client device supports in the order of priority based on the client device's preference. When the server receives the codec lists from both client devices, the server will determine a common set of codec supported by both client devices, and select a codec that corresponds to the highest priority on the client device's codec list. If the client devices have different priorities assigned to the common codecs, then the client devices will go through a negotiation process to select a particular codec from the common list of codecs that both client devices agree. Once the codec is negotiated and selected for a call, the codec will not change during the middle of the call. Different codec supports different packet transmission rates. Therefore, once the codec is selected by two client devices that are calling each other, the codec and its corresponding transmission rate will be used throughout the duration of the call between the two client devices.

Diagnosing Deterioration of Call Quality

A. Diagnosing Problems Between Wireless Client Device and Access Point

As described in the previous section, the network device such as an access point can perform a deep packet inspection to determine the payload type from the RTP header, and then determine the codec based on the payload type. Moreover, the network device can determine a transmission rate based on the codec selected by the client devices for the call. Therefore, the network device can further determine an estimated number of packets per second that is anticipated to be sent in either direction between the two end-user callers after taking into account the acceptable delay and packet loss. Specifically, based on the size of each packet and the packetization interval, each codec has a specific rate at which it sends packets. This is a well-publicized number. For example, G.711 codec has a packet size of 160 bytes and packetization interval of 20 milliseconds. This leads to a packet rate of 50 packets per second.

Here, assuming that a particular wireless client device associated with an access point agrees on G.711 codec with another client device before initiating a call over the network. Once a network device (e.g., a network controller and/or an access point) determines the estimated number of packets per second to be received by the access point, with which the particular wireless client device is associated, the network device can assess the actual number of voice packets sent from the particular wireless client device and received by the access point per second. Specifically, the actual number of packets received can be obtained by polling the receive (RX) statistics for the particular wireless client device on the access point. The driver of the access point can provide the RX statistics.

If a disparity between the actual number of packets received by the access point and the estimated number of packets to be received by the access point exist, then there are packet losses in the upstream direction between the particular client device and the access point. In particular, the network device can determine whether the difference between the estimated number of packets and the actual number of packets received by the access point exceeds a threshold value. If so, the issue causing the poor call quality could be either network-specific or client-specific.

On the other hand, if the estimated number of packets and the actual number of packets are similar or the same, then it can be inferred that there is no loss in this network segment between the particular wireless client device that initiates the call and the access point. If the client devices nonetheless report poor call quality in such scenario, then it can be inferred that the poor call quality results in a problem with the other caller.

B. Diagnosing Network-Specific Problems Versus Client-Specific Problems

According to embodiments of the present disclosure, if the network device determines that call quality deteriorates due to a disparity between the estimated number of voice packets and the actual number of voice packet received by the access point from the client device, the network device can further determine whether the cause of the issue is network-specific or client-specific.

Specifically, to diagnose network-specific issues, the network device can selectively monitor one or more of the following wireless statistics for the particular wireless client device.

(1) Client Health: This is a metric that evaluates the health of a wireless client device based on a ratio between the time it takes to transmit a frame under ideal conditions and the time it takes to transmit the frame in actual conditions. For example, assuming that a wireless client device is associated with an access point. Further, assuming that the maximum rate at which the access point and the wireless client device can communicate with each other is 100 mbps. Therefore, if the access point needs to transmit a frame with 100 megabytes to the wireless client device, the access point should take 1 second to complete the transmission. However, the access point may only actually be transmitting 75 megabytes of the frame in one second. As a result, the access point would be taking 33% more time (e.g., 1.33 seconds) to transmit the frame than the amount of time for transmission (e.g., 1 second) in an ideal condition. In other words, the client health is approximately 75%. Note that, typically, the client health is assessed over a period of time and based on the ratio between the average rate of actual transmissions and the maximum transmission rate under ideal conditions. Therefore, it will is not expected to vary much from packet to packet without significant network condition changes.

(2) Received Signal Strength Indicator (RSSI): Here, the RSSI refers to the signal strength of a message that an access point receives from a wireless client device associated with the access point. The RSSI value is typically reversely related to the distance between the wireless client device and the access point. Thus, if the wireless client device is moving away from the access point, the RSSI value will be decreasing as the wireless client device moves. On the other hand, if the wireless client device is moving towards the access point, the RSSI value will be increasing as the wireless client device moves.

(3) Signal-to-Noise Ratio (SNR): The SNR here generally refers to the signal-to-noise ratio corresponding to a signal received by the access point from the wireless client device. Noise includes any other types of signals, such as non-WiFi interference or WiFi signals from other wireless networks. Typically, the SNR value will decrease as the level of network environmental interference increases. On the other hand, the SNR value will increase as the level of network environmental interference decreases.

(4) Low Signal-to-Noise Ratio Time: This refers to the number of seconds during the call when the SNR value is below a particular threshold value. A low SNR value generally corresponds to a high level of noise signals in the network. Therefore, this parameter measures the amount of time during the call when the noise level is high.

(5) RX Retry: For every frame that is sent from the wireless client device to the access point, there is a flag in the frame indicating whether the frame is the original frame being sent by the wireless client device, or a retry frame. The retry frame is a duplicate of the original frame with the retry flag set. The retry frame is sent by the wireless client device to the access point in the event that the original frame is lost during transmission. When the access point receives a frame from the wireless client device, the access point checks whether the retry flag is set in the frame. In a good network environment, there should not be too many retry frames transmitted between the wireless client device and the access point. On the other hand, when the network condition is poor, it will likely increase the number of retry packets received by the access point from the wireless client device. Therefore, if the wireless client device transmits multiple retry packets for a particular frame, or if the wireless client device transmits a retry packet for multiple frames, then it may be inferred that the network connectivity between the wireless client device and the access point is rather poor.

(6) RX Rate: When the wireless client device sends a frame to the access point, the wireless client device will indicate in a header field the transmission rate at which the wireless client device sends the frame. If the connectivity between the wireless client device and the access point is good, then the wireless client device typically sends the frame at the maximum rate that it is capable of sending. However, in poor network environments, to avoid packet losses and retry frames, the wireless client device will adapt to a lower transmission rate for the frame to the access point.

In summary, the network device can diagnose that the deterioration of the call quality is due to network-specific issues (e.g., network connectivity between the wireless client device and the access point) if the client health value is low; the RSSI corresponding to signals received by the access point from the wireless client device is low; the signal-to-noise ratio corresponding to signals received by the access point from the wireless client device is low; the amount of time during the call when the SNR value is below a particular threshold value is high; the number of RX retry frames is high; and/or the RX rate is low.

To diagnose client-specific issues, the network device can monitor one or more of the following statistics for the particular wireless client device.

(1) CPU Insufficient Time: Usually, multiple applications are running on a wireless client device concurrently. Thus, the CPU may not be able to dedicate the required amount of CPU time to a particular application. The CPU insufficient time refers to the amount of time in seconds that the CPU is unavailable for the voice call application.

(2) Microphone not functioning time: This is the number of seconds during which the microphone of the end-user (or the wireless client device) is not functioning properly.

(3) Clipping Time: This refers to the number of seconds that the wireless client device receives a clip, i.e., an incomplete receipt of the signal, during the call. Therefore, the wireless client device could not make out the sound of the voice call signal.

In summary, the network device can diagnose that the deterioration of the call quality is due to client-specific issues (e.g., problems with the end-user device) if one or more of the CPU insufficient time, microphone not functioning time, and/or the clipping time associated with the wireless client device is high.

In some embodiments, the call server may provide these client-specific statistics. In some embodiments, the applications running on the wireless client device can capture the client-side statistics and communicate with the network infrastructure. For example, the application on the wireless client device may report such statistics to a call server, which could forward the client statistics to a network controller in the wireless network.

In some embodiments, the network device assigns a weight for each of the aforementioned parameters based on how each parameter affects the call quality. For example, when the network device detects a non-zero value for a CPU insufficient time and a non-zero value for the RX retry frames. The network device will then determine the contribution of each of the CPU insufficient time and the RX retry frames to the deterioration of the call quality. Such contribution is evaluated separately for all relevant parameters associated with network-specific issues and for all relevant parameters associated with client-specific issues. Then, by comparing the contribution to the call deterioration by the network-specific parameters versus the contribution to the call deterioration by the client-specific parameters, the network device can determine whether the call quality issue is caused mostly by the network connectivity issues or the client device problems.

If all of the above statistics are good, but the end-to-end call quality indicates deteriorated call quality, then the network device can determine that the cause of the poor call quality is in the intermediate network.

Likewise, the transmit (TX) statistics for the wireless client device will also be monitored on the access point. The network device (e.g., a network controller or an access point) can determine, based on the TX statistics, whether there is a disparity between the actual number of packets transmitted to the particular wireless client device and the estimated number of packets supposed to be transmitted to the particular wireless client device after accounting for acceptable delay and packet loss factors. The same analysis described above shall be applied for the downstream traffic to the particular wireless client device to ascertain if the issue is client-specific, within the wireless segment of the network, or with the wired network infrastructure, etc.

Figure 4:
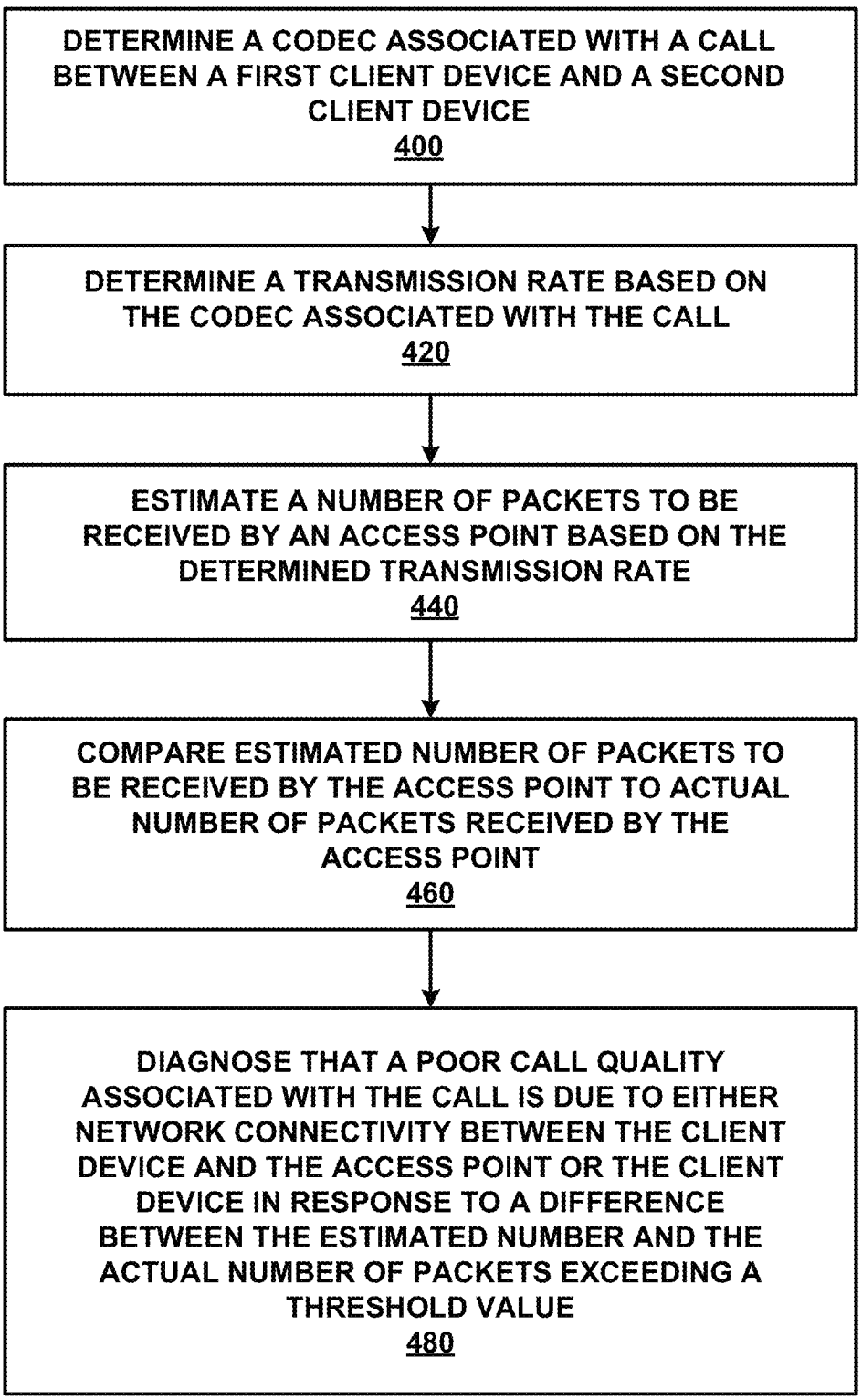
FIG. 4 is a flowchart illustrating a process for determining deterioration in call quality between one or more wireless end-users based on codec characteristics according to embodiments of the present disclosure.

Process for Determining Deterioration in Call Quality Between One or More Wireless End-Users Based on Codec Characteristics FIG. 4 is a flowchart illustrating a process for determining deterioration in call quality between one or more wireless end-users based on codec characteristics according to embodiments of the present disclosure.

During operations, a network device determines a codec associated with a call between a first client device and a second client device (operation 400). Then, the network device determines a transmission rate based on the codec associated with the call (operation 420). Furthermore, the network device estimates a number of packets to be received by an access point that the first client device is associated with based on the determined transmission rate (operation 440). Next, the network device compares the estimated number of packets to be received by the access point to an actual number of packets received by the access point (operation 460). In response to a difference between the estimated number and the actual number of packets exceeding a threshold value, the network device diagnoses that a poor call quality associated with the call is due to either the first client device or network connectivity between the first client device and the access point (operation 480). Note that the second client device can be either a wireless client device or a wired client device.

In some embodiments, the network device further receives a Real-Time Transport Protocol (RTP) packet from the first client device, and inspects a payload type field of the RTP packet to determine the codec associated with the call.

In some embodiments, the network device first diagnoses a poor end-to-end call quality associated with the call. In response to the difference between the estimated number and the actual number of packets not exceeding the threshold value, the network device subsequently diagnoses that the poor end-to-end call quality is due to network issues in network segments other than a network segment between the first client device and the access point.

In some embodiments, the network devices monitors one of more of the following network-specific parameters: (1) a client health metric based on a ratio between an average actual transmission rate and a maximum transmission rate between the first client device and the access point over a period of time; (2) a received signal strength indicator (RSSI) corresponding to signals received by the access point receives from the first client device; (3) a signal-to-noise ratio (SNR) corresponding to the signals received by the access point from the first client device; (4) an amount of time during the call when a value of the SNR is below a particular threshold; (5) a number of RX retry frames received by the access point from the first client device; and (6) a RX rate that the first client device indicates in packets transmitted to the access point. Moreover, the network device can diagnose that the poor call quality associated with the call is due to the network connectivity between the first client device and the access point in response to one of more of the followings being true: (1) a value of the client health metric indicates a low ratio between an average actual transmission rate and a maximum transmission rate between the first client device and the access point over a period of time; (2) a value of the RSSI corresponding to signals received by the access point receives from the first client device is lower than a first threshold level; (3) a value of the SNR corresponding to the signals received by the access point from the first client device is lower than a second threshold level; (4) the amount of time during the call when the value of the SNR is below a particular threshold is higher than a third threshold level; (5) the number of RX retry frames received by the access point from the first client device is higher than a fourth threshold level; and (6) the RX rate that the first client device indicates in packets transmitted to the access point is lower than a fifth threshold level.

In some embodiments, the network device monitors one of more of the following client-specific parameters: (1) a central processing unit (CPU) insufficient time during which a CPU is unavailable for an application running on the first client device corresponding to the call; (2) a microphone not functioning time during which a microphone associated with the first client device is not functioning properly; and (3) a clipping time during which the first client device receives incomplete voice signals. Moreover, the network device can diagnose that the poor call quality associated with the call is due to issues associated with the first client device in response to one of more of the followings being true: (1) the central processing unit (CPU) insufficient time during which the CPU is unavailable for an application running on the first client device corresponding to the call is higher than a first threshold level; (2) the microphone not functioning time during which the microphone associated with the first client device is not functioning properly is higher than a second threshold level; and (3) the clipping time during which the first client device receives incomplete voice signals is higher than a third threshold level.

In some embodiments, the network device evaluates a first collective contribution level to the poor call quality associated with the call based on one or more of a client health metric value, a RSSI value, a SNR value, a low SNR time, a RX retry value, and a RX rate. Also, the network device evaluates a second collective contribution level to the poor call quality associated with the call based on one or more of a CPU insufficient time, a microphone not functioning time, and a clipping time corresponding to the first client device. If the second collective contribution level is higher than the first collective contribution level, the network device diagnoses that the poor call quality associated with the call is due to issues associated with the first client device. If the first collective contribution level is higher than the second collective contribution level, the network device diagnoses that the poor call quality associated with the call is due to the network connectivity between the first client device and the access point.

In some embodiments, the network device estimates a number of downstream packets destined to the first client device and to be transmitted by the access point to the first client device based on the determined transmission rate. Furthermore, the network device compares the estimated number of packets to be transmitted by the access point to the first client device to an actual number of packets transmitted by the access point to the first client device. If a difference between the estimated number and the actual number of packets transmitted by the access point to the first client device exceeds a threshold value, the network device will diagnose that a poor call quality associated with the call is due to either the first client device or network connectivity between the first client device and the access point.

Figure 5:
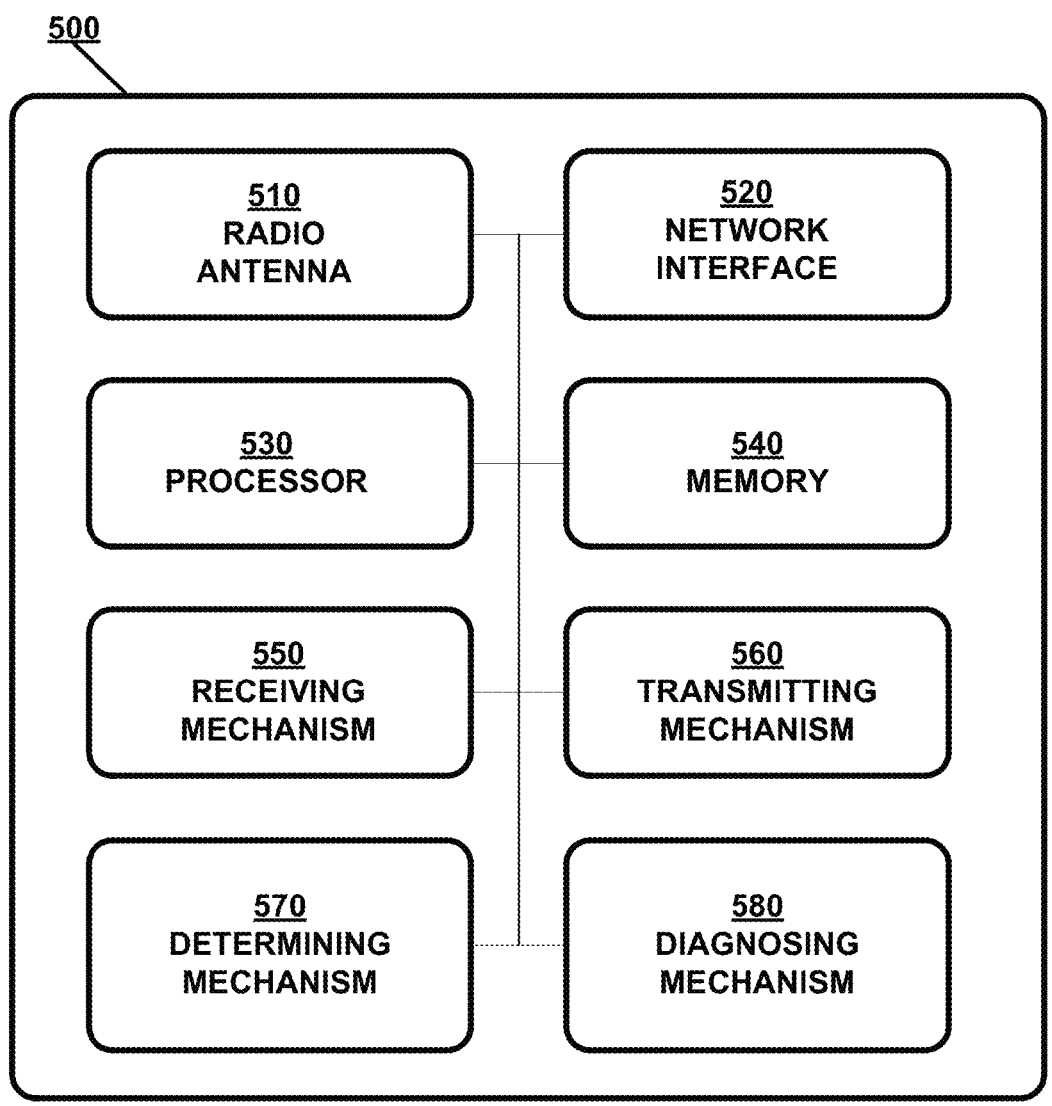
FIG. 5 is a block diagram illustrating a system for determining deterioration in call quality between one or more wireless end-users based on codec characteristics according to embodiments of the present disclosure.

System for Determining Deterioration in Call Quality Between One or More Wireless End-Users Based on Codec Characteristics FIG. 5 is a block diagram illustrating an exemplary system for determining deterioration in call quality between one or more wireless end-users based on codec characteristics according to embodiments of the present disclosure. Network device 500 includes at least one or more radio antennas 510 capable of either transmitting or receiving radio signals or both, a network interface 520 capable of communicating to a wired or wireless network, a processor 530 capable of processing computing instructions, and a memory 540 capable of storing instructions and data. Moreover, network device 500 further includes a receiving mechanism 550, a transmitting mechanism 560, a determining mechanism 570, and a diagnosing mechanism 580, all of which are in communication with processor 530 and/or memory 540 in network device 500. Network device 500 may be used as a client system, or a server system, or may serve both as a client and a server in a distributed or a cloud computing environment.

Radio antenna 510 may be any combination of known or conventional electrical components for receipt of signaling, including but not limited to, transistors, capacitors, resistors, multiplexers, wiring, registers, diodes or any other electrical components known or later become known.

Network interface 520 can be any communication interface, which includes but is not limited to, a modem, token ring interface, Ethernet interface, wireless IEEE 802.11 interface, cellular wireless interface, satellite transmission interface, or any other interface for coupling network devices.

Processor 530 can include one or more microprocessors and/or network processors. Memory 540 can include storage components, such as, Dynamic Random Access Memory (DRAM), Static Random Access Memory (SRAM), etc.

Receiving mechanism 550 generally receives one or more network messages via network interface 520 or radio antenna 510 from a wireless client. The received network messages may include, but are not limited to, requests and/or responses, beacon frames, management frames, control path frames, and so on. Specifically, receiving mechanism 550 may receive a Real-Time Transport Protocol (RTP) packet from a wireless client device.

Transmitting mechanism 560 generally transmits messages, which include, but are not limited to, requests and/or responses, beacon frames, management frames, control path frames, and so on.

Determining mechanism 570 generally determines a codec associated with a call between a first client device and a second client device. Here, the first client device is wireless client device and the second client device either a wireless client device or a wired client device. In particular, determining mechanism 570 can inspect a payload type field of the RTP packet to determine the codec associated with the call.

Furthermore, determining mechanism 570 determines a transmission rate based on the codec associated with the call. Moreover, in some embodiments, determining mechanism 570 can estimate a number of upstream packets to be received by an access point that the first client device is associated with based on the determined transmission rate. In some embodiments, determining mechanism 570 can estimate a number of downstream packets destined to the first client device and to be transmitted by the access point to the first client device based on the determined transmission rate. In addition, determining mechanism 570 can compare the estimated number of packets to be received or transmitted by the access point from/to the first client device to an actual number of packets received or transmitted by the access point from/to the first client device.

Diagnosing mechanism 580 generally diagnose a cause for a deterioration in call quality between one or more wireless end-users. Specifically, diagnosing mechanism 580 can diagnose a poor end-to-end call quality associated with the call. In response to determining mechanism 570 determines that the difference between the estimated number and the actual number of packets does not exceed a threshold value, diagnosing mechanism 580 can diagnose that the poor end-to-end call quality is due to network issues in network segments other than a network segment between the first client device and the access point.

In some embodiments, diagnosing mechanism 580 can diagnose that the poor call quality associated with the call is due to the network connectivity between the first client device and the access point in response to one of more of the followings being true:

(1) a value of the client health metric indicates a low ratio between an average actual transmission rate and a maximum transmission rate between the first client device and the access point over a period of time;

(2) a value of the RSSI corresponding to signals received by the access point receives from the first client device is lower than a first threshold level;

(3) a value of the SNR corresponding to the signals received by the access point from the first client device is lower than a second threshold level;

(4) the amount of time during the call when the value of the SNR is below a particular threshold is higher than a third threshold level;

(5) the number of RX retry frames received by the access point from the first client device is higher than a fourth threshold level; and (6) the RX rate that the first client device indicates in packets transmitted to the access point is lower than a fifth threshold level.

In some embodiments, diagnosing mechanism 580 can diagnose that the poor call quality associated with the call is due to issues associated with the first client device in response to one of more of the followings being true:

(1) the central processing unit (CPU) insufficient time during which the CPU is unavailable for an application running on the first client device corresponding to the call is higher than a first threshold level;

(2) the microphone not functioning time during which the microphone associated with the first client device is not functioning properly is higher than a second threshold level; and (3) the clipping time during which the first client device receives incomplete voice signals is higher than a third threshold level.

In some embodiments, diagnosing mechanism 580 evaluates a first collective contribution level to the poor call quality associated with the call based on one or more of a client health metric value, a RSSI value, a SNR value, a low SNR time, a RX retry value, and a RX rate. Also, diagnosing mechanism 580 evaluates a second collective contribution level to the poor call quality associated with the call based on one or more of a CPU insufficient time, a microphone not functioning time, and a clipping time corresponding to the first client device. Then, diagnosing mechanism 580 diagnoses that the poor call quality associated with the call is due to issues associated with the first client device if the second collective contribution level is higher than the first collective contribution level. On the other hand, diagnosing mechanism 580 diagnoses that the poor call quality associated with the call is due to the network connectivity between the first client device and the access point if the first collective contribution level is higher than the second collective contribution level.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by a hardware processor, causes the hardware processor to:
    determine a codec associated with a call between a first client device and a second client device;
    determine a transmission rate based on the codec associated with the call;
    estimate a number of packets to be received by an access point that the first client device is associated with based on the determined transmission rate;

compare the estimated number of packets to be received by the access point to an actual number of packets received by the access point;

in response to a difference between the estimated number and the actual number of packets exceeding a threshold value, diagnose that a poor call quality associated with the call is due to either the first client device or network connectivity between the first client device and the access point; and distinguish between the poor call quality associated with the call being due to:

the network connectivity between the first client device and the access point, based at least on a ratio being below a metric value for an average actual transmission rate and an upper actual transmission rate between the first client device and the access point over a period of time; or issues associated with the first client device.

2. The medium of claim 1, wherein the second client device is one of a wireless client device or a wired client device.

3. The medium of claim 1, further comprising to:
receive a Real-Time Transport Protocol (RTP) packet from the first client device; and
inspect a payload type field of the RIP packet to determine the codec associated with the call.

4. The medium of claim 1, further comprising to:
diagnose a poor end-to-end call quality associated with the call; and
in response to the difference between the estimated number and the actual number of packets not exceeding the threshold value, diagnose that the poor end-to-end call quality is due to issues associated with the second client device or network issues in network segments other than a network segment between the first client device and the access point.

5. The medium of claim 1; further comprising to monitor one or more of the following parameters:
a client health metric based on a ratio between an average actual transmission rate and a maximum transmission rate between the first client device and the access point over a period of time;
a received signal strength indicator (RSSI) corresponding to signals received by the access point receives from the first client device;
a signal-to-noise ratio (SNR) corresponding to the signals received by the access point from the first client device;
an amount of time during the call when a value of the SNR is below a particular threshold;
a number of RX retry frames received by the access point from the first client device; and
a RX rate that the first client device indicates in packets transmitted to the access point.

6. The medium of claim 5, further comprising to diagnose that the poor call quality associated with the call is due to the network connectivity between the first client device and the access point in response to one of more of the followings being true:
a value of the client health metric indicates a low ratio between an average actual transmission rate and a maximum transmission rate between the first client device and the access point over a period of time;
a value of the RSSI corresponding to signals received by the access point receives from the first client device is lower than a first threshold level;

a value of the SNR corresponding to the signals received e access point from the first client device is lower than a second threshold level;
the amount of time during the call when the value of the SNR is below a particular threshold is higher than a third threshold level;
the number of RX retry frames received by the access point from the first client device is higher than a fourth threshold level; and
the RX rate that the first client device indicates in packets transmitted to the access point is lower than a fifth threshold level.

7. The medium of claim 1, further comprising to monitor one of more of the following parameters:
a central processing unit (CPU) insufficient time during which a CPU is unavailable for an application running on the first client device corresponding to the call;
a microphone not functioning time during which a microphone associated with the first client device is not functioning properly; and
a clipping time during which the first client device receives incomplete voice signals.

8. The medium of claim 7, further comprising to diagnose that the poor call quality associated with the call is due to issues associated with the first client device in response to one of more of the followings being true:
the central processing unit (CPU) insufficient time during which the CPU is unavailable for an application running on the first client device corresponding to the call is higher than a first threshold level;
the microphone not functioning time during which the microphone associated with the first client device is not functioning properly is higher than a second threshold level; and
the clipping time during which the first client device receives incomplete voice signals is higher than a third threshold level.

9. The medium of claim 1, further comprising to:
evaluate a first collective contribution level to the poor call quality associated with the call based on one or more of a client health metric value, a RSSI value, a SNR value, a low SNR time, a RX retry value, and a RX rate;
evaluate a second collective contribution level to the poor call quality associated with the call based on one or more of a CPU insufficient time, a microphone not functioning time, and a clipping time corresponding to the first client device;
diagnose that the poor call quality associated with the call is due to issues associated with the first client device in response to the second collective contribution level being higher than the first collective contribution level; and
diagnose that the poor call quality associated with the call is due to the network connectivity between the first client device and the access point in response to the first collective contribution level being higher than the second collective contribution level.

10. The medium of claim 1, further comprising to:
estimate a number of packets destined to the first client device and to be transmitted by the access point to the first client device based on the determined transmission rate;
compare the estimated number of packets to be transmitted by the access point to the first client device to an actual number of packets transmitted by the access point to the first client device; and in response to a difference between the estimated number and the actual number of packets transmitted by the access point to the first client device exceeding the threshold value, diagnose that a poor call quality associated with the call is due to either the first client device or network connectivity between the first client device and the access point.

11. A system comprising:
at least one device including a hardware processor;
the system being configured to cause the hardware processor to:
    determine a codec associated with a call between a first client device and a second client device;
    determine a transmission rate based on the codec associated with the call;
    estimate a number of packets to be received by an access point that the first client device is associated with based on the determined transmission rate;
    compare the estimated number of packets to be received by the access point to an actual number of packets received by the access point;
    in response to a difference between the estimated number and the actual number of packets exceeding a threshold value, diagnose that a poor call quality associated with the call is due to either the first client device or network connectivity between the first client device and the access point; and
    distinguish between the poor call quality associated with the call being due to:
        the network connectivity between the first client device and the access point, based at least on a ratio being below a metric value for an average actual transmission rate and an upper actual transmission rate between the first client device and the access point over a period of time; or
        issues associated with the first client device.

12. The system of claim 11; wherein the second client device is one of a wireless client device or a wired client device.

13. The system of claim 11, wherein the operations further comprise to:
    receive a Real-Time Transport Protocol (RTP) packet from the first client device; and
    inspect a payload type field of the RTP packet to determine the codec associated with the call.

14. The system of claim 11, wherein the operations further comprise to:
    diagnose a poor end-to-end call quality associated with the call; and
    in response to the difference between the estimated number and the actual number of packets not exceeding the threshold value, diagnose that the poor end-to-end call quality is due to issues associated with the second client device or network issues in network segments other than a network segment between the first client device and the access point.

15. The system of claim 11; wherein the operations further comprise to monitor one or more of the following parameters:
    a client health metric based on a ratio between an average actual transmission rate and a maximum transmission rate between the first client device and the access point over a period of time;
    a received signal strength indicator (RSSI) corresponding to signals received by the access point receives from the first client device;
    a signal-to-noise ratio (SNR) corresponding to the signals received by the access point from the first client device; and
    an amount of time during the call when a value of the SNR is below a particular threshold; a number of RX retry frames received by the access point from the first client device;
    and a RX rate that the first client device indicates in packets transmitted to the access point.

16. The system of claim 15; wherein the operations further comprise to diagnose that the poor call quality associated with the call is due to the network connectivity between the first client device and the access point in response to one of more of the followings being true:
    a value of the client health metric indicates a low ratio between an average actual transmission rate and a maximum transmission rate between the first client device and the access point over a period of time;
    a value of the RSSI corresponding to signals received by the access point receives from the first client device is lower than a first threshold level;
    a value of the SNR corresponding to the signals received by the access point from the first client device is lower than a second threshold level;
    the amount of time during the call when the value of the SNR is below a particular threshold is higher than a third threshold level;
    the number of RX retry frames received by the access point from the first client device is higher than a fourth threshold level; and
    the RX rate that the first client device indicates in packets transmitted to the access point is lower than a fifth threshold level.

17. The system of claim 11, wherein the operations further comprise to monitor one of more of the following parameters:
    a central processing unit (CPU) insufficient time during which a CPU is unavailable for an application running on the first client device corresponding to the call;
    a microphone not functioning time during which a microphone associated with the first client device is not functioning properly; and
    a clipping time during which the first client device receives incomplete voice signals.

18. The system of claim 17, wherein the operations further comprise to diagnose sing that the poor call quality associated with the call is due to issues associated with the first client device in response to one of more of the followings being true:
    the central processing unit (CPU) insufficient time during which the CPU is unavailable for an application running on the first client device corresponding to the call is higher than a first threshold level;
    the microphone not functioning time during which the microphone associated with the first client device is not functioning properly is higher than a second threshold level, and
    the clipping time during which the first client device receives incomplete voice signals is higher than a third threshold level.

19. The system of claim 11, wherein the operations further comprise to:
    evaluate a first collective contribution level to the poor call quality associated with the call based on one or more of a client health metric value, a RSSI value, a SNR value, a low SNR time, a RX retry value, and a RX rate;

evaluate a second collective contribution level to the poor call quality associated with the call based on one or more of a CPU insufficient time, a microphone not functioning time, and a clipping time corresponding to the first client device;

diagnose that the poor call quality associated with the call is due to issues associated with the first client device in response to the second collective contribution level being higher than the first collective contribution level; and diagnose that the poor call quality associated with the call is due to the network connectivity between the first client device and the access point in response to the first collective contribution level being higher than the second collective contribution level.

20. The system of claim 11, wherein the operations further comprise to:

estimate a number of packets destined to the first client device and to be transmitted by the access point to the first client device based on the determined transmission rate;

compare the estimated number of packets to be transmitted b, the access point to the first client device to an actual number of packets transmitted by the access point to the first client device; and in response to a difference between the estimated number and the actual number of packets transmitted by the access point to the first client device exceeding the threshold value, diagnose that a poor call quality associated with the call is due to either the first client device or network connectivity between the first client device and the access point.

* * * * *